United States Patent Office 2,858,609
Patented Nov. 4, 1958

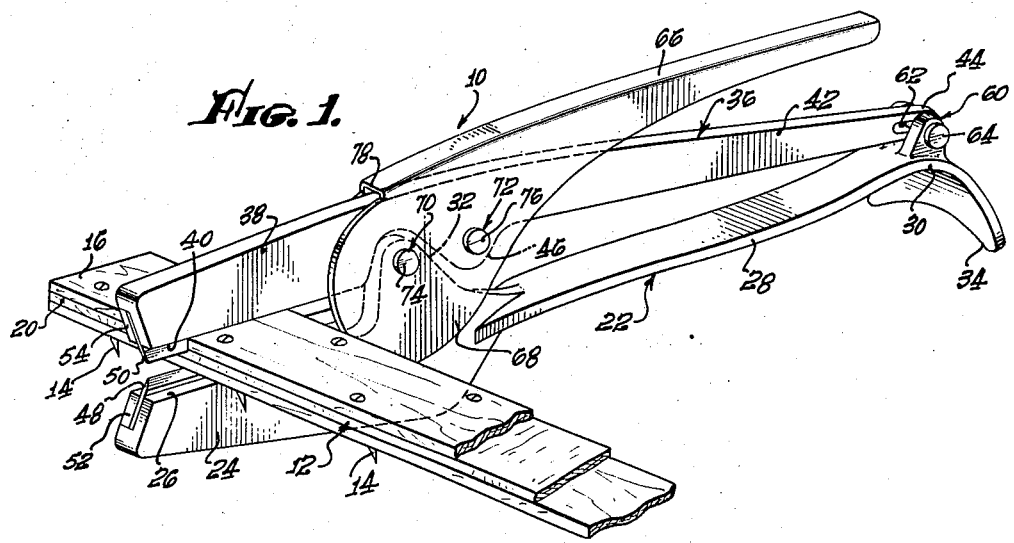
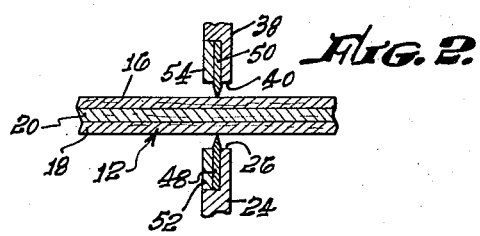
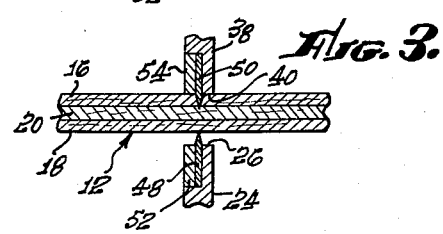
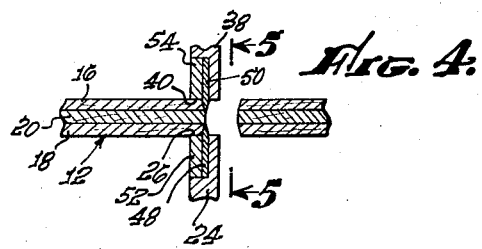
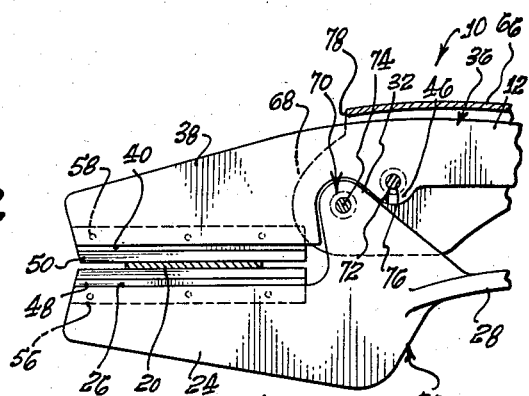
Nov. 4, 1958 — H. J. HILL — 2,858,609
CUTTER
Filed Jan. 25, 1957
Harvey J. Hill,
INVENTOR.
BY HIS ATTORNEYS
Harris, Kiech, Foster & Harris

2,858,609

CUTTER

Harvey J. Hill, Monterey Park, Calif., assignor to Roberts Manufacturing Co., Los Angeles, Calif., a corporation of California Application January 25, 1957, Serial No. 636,430

6 Claims. (Cl. 30—173)

The present invention relates in general to means for cutting articles and, more particularly, to a cutter and especially designed for cutting transversely thereof plywood strips having a specific structure, it being understood, however, that the cutter of the invention may in many instances be utilized for other purposes.

In laying carpeting, a common practice is to secure the edges of the carpeting in place by hooking them over tapered or pointed elements which are inclined upwardly and outwardly away from the center of the carpeted area. Such pointed elements frequently are nails, or the like, driven through plywood strips, the nails being nonperpendicular to the strips in planes extending transversely thereof, so that, when the strips are secured to a floor around the edges of an area to be carpeted in properly oriented, inverted positions, the pointed ends of the nails project upwardly from the strips and slope outwardly away from the area to be carpeted. Consequently, it is merely necessary to hook the edges of the carpeting over such upwardly and outwardly sloping pointed elements to secure the carpet edges in place.

The plywood strips most commonly used for the foregoing purposes are of three-ply construction. Ordinarily, the grain of the outer plies in a three-ply strip extends generally longitudinally of the strip and the grain of the intermediate ply extends generally transversely thereof. However, the invention is applicable to any strip having an odd number of plies and having a central ply the grain of which is generally transverse.

A primary object of the invention is to provide a cutter for cutting plywood strips of the foregoing nature into appropriate lengths for a particular area to be carpeted.

Basically, the cutter of the invention includes opposed jaws carrying opposed blades for cutting such a plywood strip transversely thereof, the jaws being relatively movable toward and away from each other. To provide a convenient frame of reference in describing the cutter of the invention hereinafter, the nouns identifying various components of the cutter, including the jaws and the blades, will be preceded by one or the other of the adjectives "upper" and "lower." However, it will be understood that these adjectives, and such terms as "above," "below," "upwardly," "downwardly," and the like, applied to the cutter of the invention hereinafter, relate only to the normal operating position of such cutter.

An important object of the invention is to provide a cutter the upper and lower blades of which respectively cut the upper and lower plies transversely of the grains thereof, and which then sever the intermediate or center ply primarily by a splitting action substantially parallel to the grain of such intermediate ply. Thus, the upper and lower blades need never actually touch each other to cause complete severing of the plywood strip and the total blade travel may be less than the total thickness of the strip. This reduction in total blade travel is, in accordance with the present invention, utilized to provide additional leverage for the distance the blades actually travel. Consequently, the cutter of the invention has a higher degree of mechanical efficiency than any of comparable size the blades of which must travel the full thickness of the material being severed, which is an important feature of the invention.

More particularly, an important object of the invention is to provide a cutter having upper and lower blades respectively provided with downwardly facing upper and upwardly facing lower surfaces from which the respective upper and lower blades project distances less than one-half the thickness of the plywood strip, but greater than the thicknesses of the upper and lower plies outwardly of the center ply thereof. Consequently, the surfaces of the jaws act as stops limiting penetration of the blades to an extent sufficient only to produce cutting of the outer plies, the intermediate ply then being severed by a splitting operation due to the wedging action of the blades as they penetrate the intermediate ply to a total extent less than the thickness thereof, the opposed blades being disposed in a common plane to achieve such transverse splitting of the intermediate ply without actual blade penetration therethrough.

Providing the upper and lower jaws of the cutter with the downwardly facing upper and upwardly facing lower surfaces mentioned, and locating the upper and lower blades carried by such jaws in the central plane of such surfaces, provide on both sides of the blades shoulders which serve as stops to limit penetration of the blades into the plywood strip to the extent mentioned and which also serve to keep the blades away from the nails extending through the plywood strip and thus prevent contact between the blades and such nails to prevent blade damage, which is an important feature.

Another object of the invention is to provide a cutter having means for opening and closing the upper and lower jaws by producing movement of the upper jaw only without movement of the lower jaw. This mode of operation permits opening and closing the upper and lower jaws with the lower jaw stationary, although, as will appear hereinafter, the cutter of the invention is also susceptible of the more conventional mode of operation, wherein both upper and lower jaws move simultaneously relative to a fixed reference. The advantage of a mode of operation which permits the lower jaw to remain stationary is that the cutter of the invention may be operated with the lower jaw in engagement with a floor, or the like, without movement of the lower jaw relative to such floor. This prevents marring of the floor, and also permits opening and closing of the upper and lower jaws by operating forces applied to one handle only, which are important features.

Considering how the foregoing is accomplished, the invention contemplates a cutter comprising: an elongated lower member including the lower jaw and including a lower handle extending longitudinally from the lower jaw and terminating in an outer end; an elongated upper member substantially paralleling and located above the lower member, the upper member including the upper jaw in opposing relation to the lower jaw and including an arm extending longitudinally from the upper jaw and terminating in an outer end; first connecting means pivotally connecting the outer end of the arm to the lower handle and providing for longitudinal movement of the upper member relative to the lower member; an upper handle disposed generally above the upper member and crossing the upper and lower members between the upper and lower jaws and the outer ends of the arm and the lower handle; second connecting means pivotally connecting the upper handle to the lower member between the lower jaw and the outer end of the lower handle; and third connecting means pivotally connecting the upper handle to the upper member between the upper jaw and the outer end of the arm extending therefrom.

With the foregoing construction, the upper member, which includes the upper jaw, and the lower member, which includes the lower jaw, do not cross so that opening and closing movement of the upper and lower jaws may be produced by the upper handle without movement of the lower member relative to a floor, or the like, on which it rests, this being an important feature of the invention for the reasons hereinbefore indicated.

Another important object of the invention is to provide such a lower member wherein the lower jaw is off-set downwardly relative to the lower handle and to provide such a lower member which includes a depending bifurcated leg extending downwardly from the outer end of the lower handle. With this construction, when the lower jaw and the lower ends of the depending leg mentioned engage a surface such as a floor, they space the lower handle upwardly from the floor so that the fingers of an operator may be inserted thereunder readily to operate the cutter while the lower member is resting on the floor, which is an important feature. The bifurcated leg also provides three-point support for stability, which is an important feature.

Another object is to locate the third connecting means, for pivotally connecting the upper handle to the upper member, between the second connecting means, for connecting the upper handle to the lower member, and the outer end of the arm extending from the upper jaw. With this arrangement, rocking of the upper handle relative to the lower member about the pivot axis provided by the second connecting means results in longitudinal movement of the upper member relative to the lower member in pivoting the upper member relative to the lower about the pivot axis of the first connecting means at the outer end of the arm of the upper member. Such longitudinal movement of the upper member relative to the lower member results in corresponding longitudinal movement of the upper jaw relative to the lower jaw to produce corresponding longitudinal movement of the upper blade relative to the lower blade. Consequently, the cutter of the invention operates with a slicing action on the plywood strip to facilitate cutting thereof, which is an important feature.

Another object is to locate the third connecting means closely adjacent the second connecting means to provide a high mechanical advantage for the upper handle to facilitate cutting of the plewood strip by the blades, which is an important feature.

Another object of the invention of considerable importance is to locate the first connecting means, for connecting the outer end of the arm extending from the upper jaw to the lower handle at the outer end of the lower handle, at the point where the depending leg of the lower member extends downwardly from the outer end of the lower handle. With this construction, the pivot axis provided by the first connecting means is located the maximum possible distance from the upper and lower jaws to minimize variations in the angle between the upper jaw and the lower jaw as the upper member is pivoted relative to the lower member. Consequently, the edges of the upper and lower blades remain substantially parallel as the upper and lower jaws are opened and closed. This permits locating the upper and lower blades close to the fulcrum provided by the second connecting means mentioned, which connecting means pivotally interconnects the upper handle and the lower member. Expressed in other words, this permits the plywood strip to be positioned between the upper and lower blades a minimum distance from the fulcrum between the upper handle and the lower member so that maximum leverage is available, this being an important feature.

Another object is to provide a cutter wherein the second connecting means pivotally connects the upper handle to an upwardly extending lower projection on the lower member located closely adjacent the lower jaw and between the lower jaw and the outer end of the lower handle. A related object is to provide a cutter wherein the third connecting means pivotally connects the upper handle to a downwardly extending upper projection on the upper member located between the lower projection mentioned and the outer end of the lower handle and closely adjacent the lower projection. Connecting the upper handle to such projections on the lower and upper members results in the high mechanical advantage and maximum leverage hereinbefore discussed, which is an important feature.

The foregoing objects, advantages, features and results of the present invention, together with various other objects, advantages, features and results thereof which will be evident to those skilled in the art in the light of this disclosure, may be attained with the exemplary embodiment of the invention described in detail hereinafter and illustrated in the accompanying drawing, in which:

Fig. 1 is a perspective view of a cutter embodying the invention in use to cut a plywood strip;

Figs. 2, 3 and 4 are transverse sectional views of the jaws of the cutter illustrating successive positions of the blades carried by the jaws in severing the plywood strip; and Fig. 5 is a view taken along the arrowed line 5—5 of Fig. 4.

Referring to the drawing, the numeral 10 designates shears of the invention in use to cut transversely thereof a three-ply plywood strip 12 having therethrough nails 14 which are nonperpendicular to the strip in transverse planes, as hereinbefore outlined. The outermost plies of the strip 12 are designated by the numerals 16 and 18, respectively, while the intermediate ply is designated by the numeral 20. The grains of the strips of wood forming the outer plies 16 and 18 extend longitudinally thereof, while the grain of the intermediate ply extends transversely of the strip 12.

The cutter 10 comprises an elongated lower member 22 which includes a lower jaw 24 having an upwardly facing lower surface 26 and which includes a lower handle 28 extending longitudinally from the lower jaw and terminating in an outer end 30. The lower member 22 is provided with an upwardly extending lower projection 32 closely adjacent the lower jaw 24 and between such lower jaw and the outer end 30 of the lower handle 28. The lower jaw 24 is offset downwardly relative to the lower handle 28 and the lower member 22 includes a depending, bifurcated leg 34 which extends downwardly from the outer end 30 of the lower handle and which has transversely spaced lower ends, whereby to space the lower handle upwardly from a supporting surface, such as a floor, engaged by the lower jaw and the lower ends of the depending leg. This permits insertion of the operator's fingers under the lower handle 28 even when the lower member 22 is in engagement with a floor, or other surface, in the manner specified, there being three-point engagement with the floor for stability.

The cutter 10 also includes an elongated upper member 36 substantially paralleling and located above the lower member 22, the upper member including an upper jaw 38 disposed in opposing relation to the lower jaw 24 and having a downwardly facing upper surface 40. The upper member 36 further includes an arm 42 extending longitudinally from the upper jaw 38 and terminating in an outer end 44 positioned adjacent the outer end 30 of the lower handle 28. The upper member 36 is also provided with a downwardly extending upper projection 46 adjacent the upper jaw 38 and located between such upper jaw and the outer end 44 of the arm 42. More particularly, the upper projection 46 is located closely adjacent the lower projection 32 and generally between it and the outer end 30 of the lower handle 28.

The lower and upper jaws 24 and 38 respectively carry lower and upper blades 48 and 50 disposed in opposing relation and in a common plane, which plane bisects the lower and upper jaw surfaces 26 and 40. This results in the provision of shoulders on opposite sides of the blades 48 and 50, such shoulders being relatively wide. For the reasons hereinbefore outlined, the blades 48 and 50 project from the jaw surfaces 26 and 40 distances less than one-half the thickness of the plywood strip 12, but greater than the thicknesses of the outer plies 16 and 18.

Preferably, the blades 48 and 50 are removably mounted on the jaws 24 and 38, the blades being shown as retained by elements 52 and 54 which form parts of the jaws 24 and 38 and which are secured to body portions of such jaws by screws 56 and 58, or the like. As will be apparent, the retaining elements 52 and 54 provide the aforementioned shoulders on one side of the blades 48 and 50, respectively. With this construction, whenever the blades 48 and 50 become dull, they may be replaced easily, thereby avoiding tedious resharpening.

The outer end 44 of the arm 42 of the upper member 36 is pivotally connected to the outer end 30 of the lower handle 28 by a first connecting means 60 which provides for longitudinal movement of the upper member 36 relative to the lower member 22 so as to provide for longitudinal movement of the upper blade 50 relative to the lower blade 48 as the upper jaw 38 moves toward and away from the lower jaw 24. Such relative longitudinal blade movement, which is produced in a manner to be described, results in a slicing action on the plywood strip 12 to facilitate severing thereof, which is an important feature. The first connecting means 60 is shown as a pin-and-slot connection between the outer end 44 of the arm 42 and the outer end 30 of the lower handle 28 to provide for the aforementioned longitudinal movement of thee upper member 36 relative to the lower member 22. In the particular construction illustrated, a slot 62 of the pin-and-slot connection mentioned is formed in the outer end 44 of the arm 42 and receives a pin 64 carried by the outer end 30 of the lower handle 28.

Pivotally interconnecting the lower member 22 and the upper member 36 at the outer ends 30 and 44 of the lower handle 28 and the arm 42, respectively, provides a fulcrum for pivotal movement of the upper member 36 relative to the lower member 22 which is located a maximum distance from the jaws 24 and 38. Consequently, as the upper member 36 pivots relative to the lower member 22 about the longitudinally shiftable pivot axis provided by the first connecting means 60, the angle between the edges of the blades 48 and 50 varies but slightly, these blade edges remaining substantially parallel. This provides a substantially uniform cutting action all the way across the plywood strip 12 and, as will become apparent, permits positioning the plywood strip in close proximity to a fulcrum to be described so as to achieve maximum leverage.

The cutter 10 includes an upper handle 66 disposed generally above the upper member 36 and having a bifurcated inner end 68 crossing the upper and lower members 36 and 22 between the upper and lower jaws 38 and 24 and the outer ends 44 and 30 of the arm 42 and the lower handle 28, respectively.

A second connecting means 70 pivotally connects the upper handle 66 to the lower projection 32 on the lower member 22 and a third connecting means 72 pivotally connects the upper handle to the upper projection 46 on the upper member 36, these connecting means being shown as comprising simple pivot pins 74 and 76, respectively. As will be apparent, the second connecting means 70 between the upper handle 66 and the lower projection 32 acts as a fulcrum for the upper handle 66, the substantially parallel relation hereinbefore mentioned between the edges of the blades 48 and 50 permitting positioning of the plywood strip 12 close to this fulcrum. As the upper handle 66 is pivoted about the fulcrum provided by the second connecting means 70, it pivots relative to the upper member 36 about the axis of the third connecting means 72 to pivot the upper member 36 relative to the lower member 22 about the shifting pivot axis provided by the first connecting means 60. The longitudinal movement of the upper member 36 relative to the lower member 22 as it pivots relative thereto causes one or both of the blades 48 and 50 to operate with a slicing action, the location of the first connecting means 60 at the outer ends 30 and 44 of the lower handle 28 and the arm 42 maintaining the desired substantially parallel relation between the blade edges.

Considering the over-all operation of the cutter 10, the jaws 24 and 38 are first opened by pivoting the upper handle 66 in the counterclockwise direction, as viewed in the drawing. Jaw-opening movement of the upper handle 66 is limited by engagement of a shoulder 78 on the upper handle with the upper surface of the upper member 36. Preferably, the shoulder 78 and the upper surface of the upper member 36 are so related that the upper handle cannot be pivoted beyond a position to receive a plywood strip 12 of a predetermined thickness, thereby eliminating wasted effort in opening the jaws 24 and 38 an excessive amount.

With the jaws 24 and 38 open, the plywood strip 12 is inserted between the blades 48 and 50. The relatively wide shoulders on opposite sides of the blades provided by centering the blades with respect to the jaw surfaces 26 and 40 serve to prevent contact between the blades and any of the nails 14, which is an important feature.

With the strip 12 inserted between the blades 48 and 50 in the foregoing manner, the jaws 24 and 38 are closed by pivoting the upper handle 66 in the clockwise direction. This may be accomplished by gripping the upper handle 66 and the lower handle 28 in the conventional manner, or it may be accomplished by placing the cutter 10 on a floor, or the like, with the lower jaw and the depending leg 34 resting on the floor, and then pressing downwardly on the upper handle 66. Also, because of the upward offset of the lower handle 28 provided by the downwardly-offset lower jaw 24 and the depending leg 34, both the lower handle 28 and the upper handle 66 may be gripped in the usual way with the lower member 22 resting on a floor, or similar surface.

The substantially parallel blade-edge relation maintained by the location of the first connecting means 60 during pivoting of the upper member 36 relative to the lower member 22, permits locating the plywood strip 12 between the blades 48 and 50 in close proximity to the fulcrum between the upper handle 66 and the lower member 22 provided by the second connecting means 70. This provides the operator with maximum leverage, as does the close spacing between the second connecting means 70 and the third connecting means 72. Also, the location of the first connecting means 60 as far as possible from the blades 48 and 50 produces a substantially uniform cutting action all the way across the strip 12 by maintaining the blade edges substantially parallel.

Referring now to Fig. 2 of the drawing, the upper handle 66 has been pivoted in the clockwise direction relative to the lower member 22 to an extent sufficient to bring the edges of the blades 48 and 50 into engagement with the outer surfaces of the outer plies 18 and 16, respectively. Further clockwise pivoting of the upper handle 66, as viewed in the drawing, will result in cutting penetration of one or both of the blades 48 and 50 into one or both of the plies 18 and 16, respectively. Usually, one blade meets with less resistance than the other, and penetrates the corresponding ply to the maximum extent first, as shown in Fig. 3. Continued clockwise pivoting of the upper handle 66 then results in penetration of the other outer ply by the other blade, Fig. 4.

Since the upper member 36 is moved longitudinally of the lower member 22 during pivoting of the upper handle 66 toward the lower handle 28 because of the hereinbefore described positional relation between the second and third connecting means 70 and 72, one or both of the blades 48 and 50 operate with a slicing action transversely of the corresponding outer plies 18 and 16. For example, if the strip 12 is held stationary by the lower blade 48, the upper blade 50 operates with a slicing action on the upper ply 16. Conversely, if the upper blade 50 sticks to the upper ply 16, such longitudinal movement of the upper member 36 will result in dragging the lower ply 18 over the lower blade 48 to produce a slicing action. It is also possible for relative movement between the strip 12 and both the lower and upper blades 48 and 50 to occur, whereby both are sliced simultaneously.

In any event, the blades 48 and 50 ultimately cut through the plies 18 and 16 and into the ply 20 to the extent permitted by the shoulders formed by the jaw surfaces 26 and 40, as shown in Fig. 4 of the drawing. As previously stated, the blades 48 and 50 project from the jaw surfaces 26 and 40 distances less than one-half the thickness of the plywood strip 12, but greater than the thicknesses of the outer plies 18 and 16. Consequently, by the time the jaw surfaces 26 and 40 engage the outer surfaces of the plies 18 and 16, respectively, the blades 48 and 50 have cut through the plies 18 and 16 into the ply 20, but have not cut through the latter.

Limiting the closing movement of the blades 48 and 50 in this manner so that they do not come in contact results in additional leverage during the interval that the blades do move toward each other, this additional leverage being achieved by the closer spacing of the connecting means 70 and 72 permitted by the reduced blade travel. Expressed differently, in any conventional cutter, the maximum practical handle travel is limited by the span of the thumb and fingers, while the blade travel is determined by the thickness of the material to be cut. With the present invention, the blade travel is reduced to a value less than the material thickness while maintaining the same maximum handle travel or span. This permits relocating the pivots to reduce the ratio of blade travel to handle travel, thereby increasing the leverage proportionately. Thus, virtually all available handle movement is applied to cutting the outer plies without wasting handle movement in cutting the easily split center ply.

Despite the fact that the jaw surfaces 26 and 40 act as stops preventing complete closure of the blades 48 and 50, severing of the plywood strip 12 nevertheless results because of the fact that the necessary taper of the blade edges splits the transversely-grained intermediate ply 20 with a wedging action. Thus, as soon as the blades 48 and 50 cut through the outer plies 18 and 16 and penetrate the intermediate ply 20 to the extent permitted by the jaw surfaces 26 and 40, the severing of the strip 12 is completed by splitting of the intermediate ply 20 transversely of the strip, as indicated in Fig. 4 of the drawing. Thus, complete penetration of the strip 12 by the blades 48 and 50 is unnecessary, which is an important feature.

Although an exemplary embodiment of the invention has been disclosed herein for purposes of illustration, it will be understood that various changes, modifications, and substitutions may be incorporated therein without departing from the spirit of the invention as defined by the claims which follow:

I claim as my invention:

1. A cutter for cutting an article, including: an elongated lower member including a lower jaw having an upwardly facing lower surface and including a lower handle extending longitudinally from said lower jaw and terminating in an outer end; an elongated upper member substantially paralleling and located above said lower member, said upper member including an upper jaw disposed in opposing relation to said lower jaw and having a downwardly facing upper surface, said upper member further including an arm extending longitudinally from said upper jaw and terminating in an outer end positioned adjacent said outer end of said lower handle; first connecting means pivotally connecting said outer end of said arm to said outer end of said lower handle and providing for longitudinal movement of said upper member relative to said lower member so as to provide for longitudinal movement of said upper jaw relative to said lower jaw; an upper handle disposed generally above said upper member and crossing said upper and lower members between said upper and lower jaws and said outer ends of said arm and said lower handle; second connecting means pivotally connecting said upper handle to said lower member between said lower jaw and said outer end of said lower handle; third connecting means pivotally connecting said upper handle to said upper member between said upper jaw and said outer end of said arm; and opposed upper and lower blades on said upper and lower jaws, respectively, and disposed in a common plane, said upper and lower blades projecting from said upper and lower surfaces, respectively, of said upper and lower jaws distances less than one-half the thickness of the article to be cut thereby.

2. A cutter for cutting generally transversely thereof a plywood strip having an odd number of plies in which the grain of the center ply extends generally transversely of the strip, including: an elongated lower member including a lower jaw having an upwardly facing lower surface and including a lower handle extending longitudinally from said lower jaw and terminating in an outer end; an elongated upper member substantially paralleling and located above said lower member, said upper member including an upper jaw disposed in opposing relation to said lower jaw and having a downwardly facing upper surface, said upper member further including an arm extending longitudinally from said upper jaw and terminating in an outer end positioned adjacent said outer end of said lower handle; first connecting means pivotally connecting said outer end of said arm to said outer end of said lower handle and providing for longitudinal movement of said upper member relative to said lower member so as to provide for longitudinal movement of said upper jaw relative to said lower jaw; an upper handle disposed generally above said upper member and crossing said upper and lower members between said upper and lower jaws and said outer ends of said arm and said lower handle; second connecting means pivotally connecting said upper handle to said lower member between said lower jaw and said outer end of said lower handle; third connecting means pivotally connecting said upper handle to said upper member between said upper jaw and said outer end of said arm; and opposed upper and lower blades on said upper and lower jaws, respectively, and disposed in a common plane, said upper and lower blades projecting from said upper and lower surfaces, respectively, of said upper and lower jaws distances less than one-half the thickness of the plywood strip, but greater than the thicknesses of the plies outwardly of the center ply thereof.

3. A cutter for cutting generally transversely thereof a plywood strip having an odd number of plies in which the grain of the center ply extends generally transversely of the strip, including: an elongated lower member including a lower jaw having an upwardly facing lower surface and including a lower handle extending longitudinally from said lower jaw and terminating in an outer end; an elongated upper member substantially paralleling and located above said lower member, said upper member including an upper jaw disposed in opposing relation to said lower jaw and having a downwardly facing upper surface, said upper member further including an arm extending longitudinally from said upper jaw and terminating in an outer end; first connecting means pivotally connecting said outer end of said arm to said lower handle and providing for longitudinal movement of said upper member relative to said lower member so as to provide for longitudinal movement of said upper jaw relative to said lower jaw; an upper handle disposed generally above said upper member and crossing said upper and lower members between said upper and lower jaws and said outer ends of said arm and said lower handle; second connecting means pivotally connecting said upper handle to said lower member between said lower jaw and said outer end of said lower handle; third connecting means pivotally connecting said upper handle to said upper member between said upper jaw and said outer end of said arm; and opposed upper and lower blades on said upper and lower jaws, respectively, and disposed in a common plane, said upper and lower blades projecting from said upper and lower surfaces, respectively, of said upper and lower jaws distances less than one-half the thickness of the plywood strip, but greater than the thicknesses of the plies outwardly of the center ply thereof.

4. A cutter for cutting generally transversely thereof a plywood strip having an odd number of plies in which the grain of the center ply extends generally transversely of the strip, including: relatively movable, opposed, upper and lower jaws respectively having downwardly facing upper and upwardly facing lower surfaces; and opposed upper and lower blades on said upper and lower jaws, respectively, and disposed in a common plane, said upper and lower blades projecting from said upper and lower surfaces, respectively, of said upper and lower jaws distances less than one-half the thickness of the plywood strip, but greater than the thicknesses of the plies outwardly of the center ply thereof.

5. A cutter for cutting an article, including: relatively movable, opposed, upper and lower jaws respectively having downwardly facing upper and upwardly facing lower surfaces; and opposed upper and lower blades on said upper and lower jaws, respectively, and disposed in a common plane, said upper and lower blades projecting from said upper and lower surfaces, respectively, of said upper and lower jaws distances less than one-half the thickness of the article to be cut thereby.

6. In combination: two opposed jaws relatively movable between open and closed positions; and opposed blades on said jaws, respectively, said blades projecting from said jaws, respectively, distances less than one-half of the distance between said jaws when said jaws are in said closed position.

References Cited in the file of this patent

UNITED STATES PATENTS

| | | |
|---|---|---|
| 143,454 | Lapham | Oct. 7, 1873 |
| 265,161 | Slanker | Sept. 26, 1882 |
| 295,718 | Bayrer | Mar. 25, 1884 |
| 552,364 | Glunt | Dec. 31, 1895 |
| 2,564,154 | Compton | Aug. 14, 1951 |

UNITED STATES PATENT OFFICE
CERTIFICATE OF CORRECTION

Patent No. 2,858,609      Harvey J. Hill      November 4, 1958

It is hereby certified that error appears in the printed specification of the above numbered patent requiring correction and that the said Letters Patent should read as corrected below.

Column 1, line 16, strike out "and", second occurrence; line 37, for "purposes" read -- purpose --; column 3, line 46, for "plewood" read -- plywood --; column 4, line 28, for "shears" read -- the cutter --; column 5, line 34, for "thee" read -- the --.

Signed and sealed this 3rd day of February 1959.

(SEAL)
Attest:

KARL H. AXLINE
Attesting Officer

ROBERT C. WATSON
Commissioner of Patents